United States Patent
Gajewski

[15] 3,696,360
[45] Oct. 3, 1972

[54] IMPENDING CONDENSATION ALARM
[72] Inventor: Wieslaw Gajewski, Chicago, Ill.
[73] Assignee: Vapor Corporation, Chicago, Ill.
[22] Filed: June 16, 1971
[21] Appl. No.: 153,614

[52] U.S. Cl...................340/235, 73/17 A, 73/336.5, 324/65 R
[51] Int. Cl...............................................G01n 25/00
[58] Field of Search....340/235, 228; 73/17 A, 336.5; 324/65

[56] References Cited

UNITED STATES PATENTS

| 3,422,677 | 1/1969 | Lockwood | 73/336.5 |
| 3,416,356 | 12/1968 | Bridgeman | 73/17 A |
| 3,599,862 | 8/1971 | Hogan | 340/235 X |
| 2,733,607 | 2/1956 | Miller | 73/336.5 |
| 2,904,995 | 9/1959 | Obermaier | 340/235 |
| 3,293,901 | 12/1966 | Scoyoc et al | 73/17 A |

FOREIGN PATENTS OR APPLICATIONS

| 900,194 | 7/1962 | Great Britain | 340/235 |

*Primary Examiner*—John W. Caldwell
*Assistant Examiner*—Scott F. Partridge
*Attorney*—Julian Falk et al.

[57] ABSTRACT

Device for warning of impending condensation including a sensor in contact with the element being monitored to measure conductivity at the sensor, an alarm, and electrical circuitry responding to the sensor to trigger the alarm at a given temperature above dew point.

5 Claims, 3 Drawing Figures

PATENTED OCT 3 1972

3,696,360

INVENTOR
WIESLAW GAJEWSKI

BY
Kinzer, Dorn & Zickert
ATTORNEYS

IMPENDING CONDENSATION ALARM

This invention relates in general to a device for monitoring an element and the atmosphere in which the element is placed to warn of impending condensation conditions that would be injurious to the element so that steps can be taken to avoid the impending condensation conditions, and more particularly to a device that is extremely compact and operable on a minimum amount of electrical power to warn of impending dew point temperature.

The advent of the present invention follows a searching need in industry for an impending condensation alarm to provide advance warning of condensation. Heretofore, many different types of dew point hygrometers have been developed, such as in U. S. No. 3,416,356, and which include a sensor that measures conductivity of a gaseous environment in which measurement is desired. However, a suitable cooling means has always been provided for driving the sensor, and as such, the hygrometer has been bulky and costly. Moreover, the hygrometers heretofore developed have utilized expensive readout arrangements to visually read out dew point temperature.

The present invention, answering the need for a compact and inexpensive impending condensation alarm, includes a sensor having spaced conductors in the form of a grid intimately mounted on an insulator which is in physical contact with the element being monitored. The temperature of the sensor therefore follows the temperature of the element being monitored, while the conductivity of the insulator surface is measured by the grid to describe the relationship of the temperature of the sensor surface to the dew point temperature The size of the sensor is small, on the order of ⅜ inch in diameter, to minimize thermal gradients and to facilitate its usage in small confined areas as well as large areas. The sensor is electrically connected to a circuit on a printed circuit board that is about 2 inches square and which includes a multivibrator to apply an alternating current bias to the sensor, an integrated circuit operational amplifier receiving the signal voltage of the sensor, and a voltage doubler and rectifier receiving the output of the amplifier. A transistor switch responsive to the voltage signal of the voltage doubler and rectifier is connected to an alarm which it triggers at a given voltage level. The resistance of the sensor grid is proportional to the absolute difference between the sensor temperature and dew point temperature. The sensor is mounted on a small metal base for rigidity and to enhance thermal transfer to the sensor from the surface or atmosphere being monitored. The sensor is adaptable for use in measuring impending condensation in a variety of situations, such as the atmosphere, cold water pipes, and the ground.

It is, therefore, an object of the present invention to provide a unique and compact impending condensation alarm.

Another object of this invention is in the provision of an impending condensation alarm that is compact and economical to manufacture, and which operates pursuant to a minimum amount of electrical power, and which is capable of use in measuring impending condensation for a variety of situations.

Other objects, features and advantages of the invention will be apparent from the following detailed disclosure, taken in conjunction with the accompanying sheets of drawings, wherein like reference numerals refer to like parts, in which.

Figure 1:
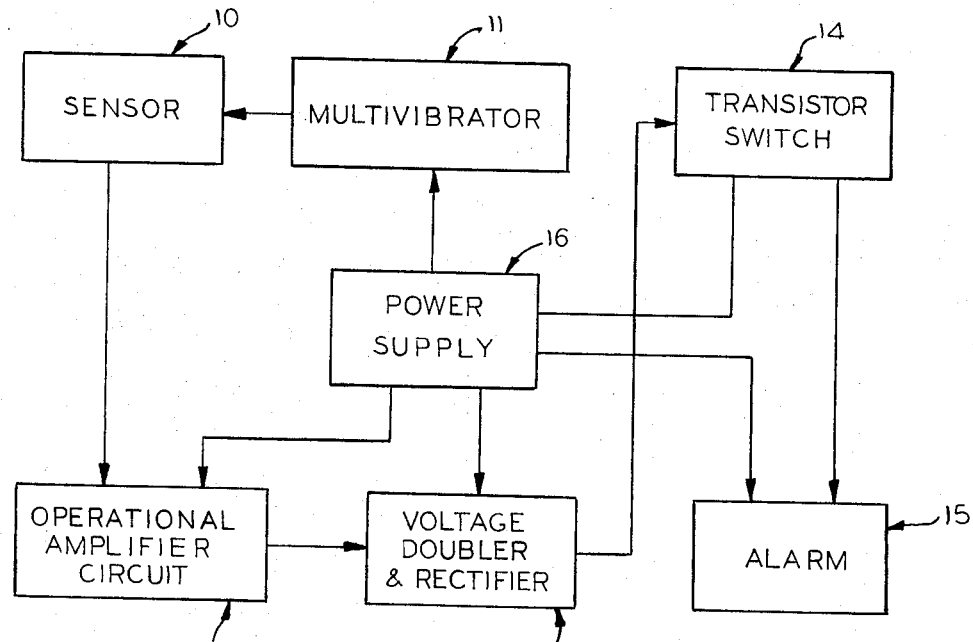
FIG. 1 is a block diagram of the impending condensation alarm according to the invention.

Referring now to the drawings, and particularly to FIG. 1, the impending condensation alarm of the invention includes a sensor 10, having applied thereto an alternating current bias by a multivibrator 11. The voltage output of the sensor is received by an integrated circuit operational amplifier 12, and the output from the amplifier is delivered to a voltage doubler and rectifier 13. A transistor switch 14 is connected to the output of the voltage doubler and rectifier, and which is triggered when the voltage reaches a certain level to energize an alarm 15. The alarm may be of any suitable type, such as a device for emitting an audible signal, a light, a heater control for energizing a heater, a control for energizing dehumidifying equipment, a relay or other. A power supply 16 is connected to the multivibrator 11, the operational amplifier 12, the voltage doubler and rectifier 13, the transistor switch 14, and the alarm 15. The power supply may be in the form of batteries or line voltage, and inasmuch as the components of the circuitry are solid state, a minimum amount of electrical power is needed.

The sensor 10 includes a pair of spaced conductors on an insulator, the conductivity of the insulator surface describing the relationship of the surface of the dew point temperature. The resistance of the surface, as measured by the spaced conductors, is proportional to the absolute difference between sensor temperature and dew point temperature, which is reflected in the voltage signal delivered to the operational amplifier 12.

Figure 3:
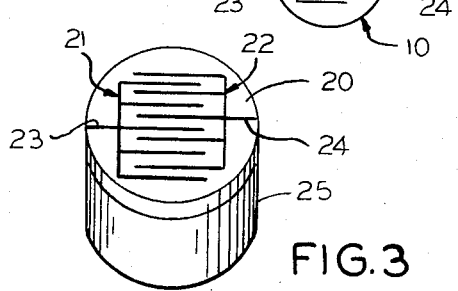
FIG. 3 is a front, perspective view of the sensor according to the invention mounted on a metal base.

The sensor 10, FIG. 3, which is adapted to follow the temperature of the element being monitored includes a disc 20 of insulating material, such as epoxy fiberglass board, and first and second spaced conductors 21 and 22 on the upper surface of the board in intimate contact therewith. This could be fabricated by printed circuit techniques. Each of the conductors include a plurality of conductor fingers interjacently arranged with eaCh other to form a grid-like arrangement. Thus, conductivity on the surface of the board 20 is measured between the finger conductors. A lead-in wire 23 is provided for the conductor 21, while the lead-in wire 24 is provided for the conductor 22. The materials employed for the conductors 21 and 22 are their respective lead-in wires are not of material consequence, although it is preferred that they be copper clad with an inert metal, such as a noble metal. The under surface of the board 20 is mounted on a metal base 25 which provides rigidity for the board 20 and also serves as a thermal transfer element between the element being monitored and the board 20. For example, the base 20 may be used to respond to atmosphere or may be mounted directly against an element being monitored, and in the latter event, it may be shaped to provide intimate contact with the element.

Figure 2:
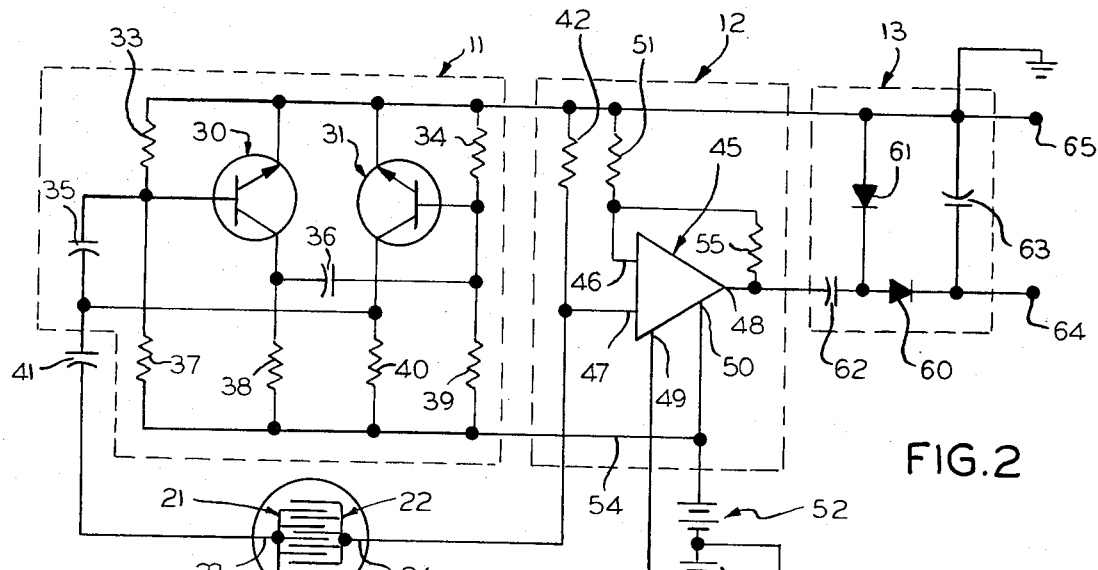
FIG. 2 is an electrical, schematic diagram of the circuitry employed on a printed circuit board to provide a voltage signal for operating a transistor switch.

The sensor 10 has applied thereto an alternating current biased by a multivibrator of any suitable type, any one of which is satisfactory, as shown in FIG. 2. The multivibrator 11 includes first and second transistors 30 and 31. A resistor 33 is connected between the base and emitter, while a resistor 34 is connected between the base and emitter of transistor 31. A capacitor 35 is connected between the base of transistor 30 and the collector of transistor 31, while a capacitor 36 is connected between the base of transistor 31 and the collector of transistor 30. Resistors 37 and 38 are connected between the base and collector of transistor 30, while resistors 39 and 40 are connected between the base and collector of transistor 31. The conductor 21 of the sensor 10 is connected to the multivibrator through a coupling capacitor 41, while the conductor 22 is connected to ground through resistor 42.

In the operational amplifier circuit, an integrated circuit operational amplifier 45 includes inputs 46 and 47, and output 48, and power inputs 49 and 50. The input 46 is connected to ground through resistor 51, while the input 47 is connected to the conductor 22 of the sensor 10. The power supply includes 9 volt batteries 52 and 53 connected in series, and their common being connected to ground, while the batteries are connected to the power outputs 49 and 50 of the operational amplifier 45. The multivibrator is connected to the batteries through line 54. A resistor 55 is connected between the input 46 and output 48 of the operational amplifier to provide feed-back, and the output 48 is connected to the voltage doubler and rectifier 13.

The voltage doubler and rectifier 13 includes diodes 60 and 61, and capacitors 62 and 63, and output taps 64 and 65, the latter of which would be connected to the transistor switch 14. Any suitable transistor switch may be employed which would be triggered when the voltage signal from the taps 64 and 65 reaches a given level.

In operation, when the voltage level at the output of the voltage doubler and rectifier reaches a given value indicating impending condensation of the element being monitored, the element 15 would be energized, it being appreciated that the resistance of the grid on the sensor 10 is proportional to the absolute difference between the sensor temperature and the dew point temperature.

The types and values of the following components have proved satisfactory.

| | |
|---|---|
| Transistors 30, 31 | 2N 3566 |
| Integrated Circuit 45 | 811 CE |
| Diodes 60, 61 | 1N 914 |
| Sensor Grid 10 | Vap-Air P/N 2683 9691 |
| Resistors 37, 39 | 100K ± 10%, ¼W, Carbon |
| Resistors 33, 34 | 22K ± 10%, ¼W, Carbon |
| Resistors 38, 40 | 3.3K ± 10%, ¼W, Carbon |
| Resistor 42 | 220K ± 10%, ¼W, Carbon |
| Resistor 51 | 2.2K ± 10%, ¼W, Carbon |
| Resistor 55 | 33K ± 10%, ¼W, Carbon |
| Capacitors 35, 41, 36 | .1 mf, 100 VDC |
| Capacitors 62, 63 | 10 mf, 10 VDC |

It will be understood that modifications and variations may be effected without departing from the scope of the novel concepts of the present invention, but it is understood that this application is to be limited only by the scope of the appended claims.

The invention is hereby claimed as follows:

1. An impending condensation alarm comprising, a sensor adapted to be in contact with the element being monitored, said sensor including an insulating board having a pair of spaced conductors intimately mounted on one surface and exposed to ambient air, the other surface of said board being in contact with the element being monitored, an alarm, electrical circuit means measuring the conductivity of the insulating board surface through the spaced conductors to describe the relationship of the temperature of the one surface to the dew point temperature and to trigger the alarm when the resistance between the spaced conductors reaches a given value warning of impending condensation.

2. The combination of claim 1, and a metal support upon which the board is mounted to rigidify same and to contact directly the element being monitored, thereby also providing a thermal conductor between the board and element being monitored.

3. The combination of claim 1, wherein said electrical circuit means includes a multivibrator connected to the spaced conductors to apply an alternating current bias thereto, an operational amplifier receiving the output from the sensor, and a voltage doubler and rectifier receiving the output from the operational amplifier.

4. The combination of claim 1, wherein said spaced conductors include a plurality of conductor fingers spaced from each other such that the conductor fingers of one of the spaced conductors are interjacently arranged with the finger conductors of the other of the spaced conductors to define a grid.

5. The combination of claim 4, and a transistor switch between the alarm and the voltage doubler triggering when the voltage output of said voltage doubler reaches a given level.

* * * * *